(12) United States Patent
Mikoshiba et al.

(10) Patent No.: US 6,689,458 B1
(45) Date of Patent: Feb. 10, 2004

(54) TRANSPARENT CONDUCTIVE LAMINATE AND TOUCH PANEL USING THE SAME

(75) Inventors: Hitoshi Mikoshiba, Tokyo (JP); Tatsuichiro Kon, Tokyo (JP); Kazuo Yahata, Tokyo (JP); Hiroshi Hara, Tokyo (JP)

(73) Assignee: Teijin Limited, Osaka (JP)

( * ) Notice: Subject to any disclaimer, the term of this patent is extended or adjusted under 35 U.S.C. 154(b) by 351 days.

(21) Appl. No.: 09/830,126

(22) PCT Filed: Aug. 30, 2000

(86) PCT No.: PCT/JP00/05865
§ 371 (c)(1),
(2), (4) Date: Apr. 24, 2001

(87) PCT Pub. No.: WO01/16963
PCT Pub. Date: Mar. 8, 2001

(30) Foreign Application Priority Data

Aug. 31, 1999 (JP) ............................................. 11-245240

(51) Int. Cl.$^7$ ................................................. B32B 5/16
(52) U.S. Cl. ....................... 428/339; 428/336; 428/402; 428/702; 428/689; 428/156; 428/220; 428/323
(58) Field of Search ................................. 428/156, 220, 428/323, 327, 332, 336, 339, 402, 500, 702, 689, 333

(56) References Cited

U.S. PATENT DOCUMENTS 6,413,629 B1 * 7/2002 Kimura

FOREIGN PATENT DOCUMENTS

| JP | 63-265625 | 11/1988 |
|----|-----------|---------|
| JP | 1-132004 | 5/1989 |
| JP | 8-216327 | 8/1996 |
| JP | 9-272183 | 10/1997 |
| JP | 10-024516 | 1/1998 |
| JP | 10-249975 | 9/1998 |
| JP | 10-323931 | 12/1998 |
| JP | 11-296303 A1 | 10/1999 |
| JP | 2000-301648 | 10/2000 |

* cited by examiner

*Primary Examiner*—Deborah Jones
*Assistant Examiner*—Wendy Bass
(74) *Attorney, Agent, or Firm*—Rader, Fishman & Grauer PLLC

(57) ABSTRACT

This invention relates to a transparent conductive laminate and to a touch panel which uses the transparent conductive laminate and has excellent durability and excellent visibility. The transparent conductive laminate contains a transparent polymer substrate and a transparent conductive layer disposed on at least one of surfaces of the transparent polymer substrate, the transparent conductive layer has a surface containing micro bumps, wherein: (1) the transparent conductive laminate contains a cross-linked polymer layer (A) containing fine particles and a cross-linked polymer layer (B) between the transparent polymer substrate and the transparent conductive layer, said cross-linked polymer layer (A) is disposed between the transparent polymer substrate and said cross-linked polymer layer (B); (2) the cross-linked polymer layer (B) contacts the transparent conductive layer; and (3) the surface of said transparent conductive layer contains the bumps having an average height of 0.3 to 1 $\mu$m and a density in the range of 350 to 1,800 bumps/mm$^2$. The transparent conductive laminate can be used as an electrode substrate to provide a touch panel which has excellent writing durability, does not generate interference fringes in the touch panel, and gives non-dim and easily readable letters on the display.

18 Claims, 2 Drawing Sheets

TRANSPARENT CONDUCTIVE LAMINATE AND TOUCH PANEL USING THE SAME

TECHNICAL FIELD

The present invention relates to a transparent conductive laminate and to a touch panel which uses the transparent conductive laminate and has excellent durability and excellent visibility.

BACKGROUND OF THE INVENTION

Recently, the wide employment of portable information-processing equipment on which a liquid crystal display for displaying information and a touch panel (called a switch panel, a membrane switch or a tablet) for inputting information were loaded was started. Most of the touch panels are resistant film type ones. Each of the resistant film type touch panel is formed by facing two transparent electrode substrates having transparent conductive layers formed thereon, respectively, each other at a distance of 10 to 100 μm. Both the transparent electrode substrates are brought into contact with each other only at a site touched by a finger, a pen, or the like, to act as a switch. For example, the selection of a menu on a display screen, the inputting of a handwritten figure, handwritten letters, or so on, can be carried out. As the transparent electrode substrates, ones manufactured by disposing the transparent conductive layers of a metal oxide such as indium tin oxide (ITO) or tin oxide containing antimony or the like on substrates such as glass substrates or various kinds of transparent polymer substrates are widely used.

In the touch panel, the transparent electrode substrate on the side to be touched by the finger, the pen, or the like (movable electrode substrate), is preferable to be flexible from a point that the figure, letters, or the like, can easily be inputted. As the movable electrode substrate, an electrode substrate obtained by disposing a transparent conductive layer on a transparent polymer film substrate or a transparent polymer sheet substrate is usually used. There has been a problem that, when a flexible transparent electrode substrate is used as a movable electrode substrate, the movable electrode substrate is loosened due to the changes of temperature and humidity, resulting in the generation of interference fringes between the movable electrode substrate and the facing fixed electrode substrate to give an indistinct screen. There has also been a problem that, when both the surface of a movable electrode substrate and the surface of a fixed electrode substrate are extremely flat, the electrode surface of the movable electrode substrate and the electrode surface of the fixed electrode substrate are adhered to each other to cause the failure in the operation of the touch panel.

In order to solve the problems, the present inventors proposed a method for making the surface of an electrode with micro bumps. In JP-A No. 8-216327 (1996) (hereunder, JP-A means Japanese unexamined patent publication) is described a touch panel that the generation of interference fringes was controlled by using a transparent conductive laminate whose transparent conductive layer surface has a central surface average roughness (SRa) of 0.05 to 0.40 μm. In JP-A No. 10-24516 (1998) is also described a transparent conductive laminate which uses silicone resin fine particles having an average particle diameter of 4.5 μm and has an excellent slipping property and whose transparent conductive layer surface has a central surface average roughness (SRa) of 0.003 to 0.04 μm. Thereby, the problems of the generation of interference fringes and of the mutual adhesion of electrode surfaces were solved, but writing durability was often insufficient. Namely, when a test for the writing durability was carried out, it was found that the peeling of the transparent conductive layer was sometimes caused on the peripheries of the electrode surface bumps of a movable electrode substrate, resulting in the deterioration of the inputting performance of the touch panel (for example, the generation of misprinting, the insufficient accuracy of position detection) after the test of the writing durability.

On the other hand, a transparent conductive laminate in which a coating layer containing fine particles was disposed between a transparent plastic film and a transparent conductive layer was proposed for improving the writing durability (JP-A No. 10-249975 (1998)). According to the description of the patent publication, the damages of the transparent conductive layer were concentrated at extremely small areas around the apexes of bumps, because the bumps were distributed on the surface of the electrode at a proper density. Consequently, even when the transparent conductive layer was damaged, the total resistance of the transparent conductive layer was largely not changed, and the accuracy of position detection was scarcely changed. Further, the good average particle diameter of fine particles contained in the coating layer was in the range of from not less than the thickness of the coating layer to three times or less than that of the coating layer, and the good density of the particles was 10,000 to 500,000 particles/$cm^2$ (100 to 5,000 particles/$mm^2$). However, the examinations of the present inventors showed that the writing durability was always not improved, even when the density of the particles was set to the range.

Further, in JP-A No. 10-323931 (1998) is described a transparent conductive laminate in which a coating layer containing particles having an average particle diameter of 1.0 to 4 μm at a number-average density of 500 to 3,000 particles/$mm^2$ and a transparent conductive layer were successively formed on a transparent plastic film to control the generation of interference fringes. However, the transparent conductive layer surface of the laminate had a ten point height (Rz) of 0.3 to 1.0 μm or larger, therefore comprised bumps of large dispersion of height, and the writing durability of the laminate was insufficient, when used as a touch panel.

A main object of the present invention is to provide a transparent conductive laminate suitable for giving a touch panel having excellent writing durability.

Another object of the present invention is to provide a touch panel which has good writing durability and excellent visibility.

DISCLOSURE OF THE INVENTION

The present inventors have paid attentions on the heights of bumps on the surface of a transparent conductive layer and have researched to solve the above-mentioned problems and obtain the touch panel which scarcely generates interference fringes and has excellent visibility giving clear letters and excellent writing durability.

Consequently, the present inventors ascertained that the writing durability did essentially not depend on the density of fine particles and that the existence of bumps, which are higher than a certain height, especially caused a problem, when the surface of a transparent conductive layer used as the electrode of the touch panel had high bumps and low bumps in a mixed state especially of large dispersion of height.

On the other hand, since adhesivity between the transparent conductive layer and a substrate such as a polymer film was also important for dynamic mechanical durability called the writing durability, the present inventors further repeatedly researched the point. It was consequently found that a peeling was caused between the transparent conductive layer and a layer containing fine particles, when the layer containing fine particles was disposed just under the transparent conductive layer in a state directly contacted with the transparent conductive layer. The inventors also examined the point and in consequence found out that it was important to control the height of bumps and the density of bumps in the layer containing fine particles and that it was extremely effective to dispose a cross-linked polymer layer between the layer containing fine particles and the transparent conductive layer in a state contacted with the transparent conductive layer.

The present invention was completed by repeating the researches on the basis of the knowledge. Namely, the present invention relates to the transparent conductive laminate which is obtained by controlling the height of the bumps and the density of the bumps in the surface of the transparent conductive layer, controlling the height of the bumps and the density of the bumps in the surface of the layer containing fine particles between the transparent conductive layer and the substrate, and disposing the cross-linked polymer layer in the state contacting with the transparent conductive layer, and is especially useful for a touch panel.

Namely, the present invention is as follows.

A transparent conductive laminate comprising a transparent polymer substrate and a transparent conductive layer disposed on at lo least one of sides of the transparent polymer substrate, the transparent conductive layer has a outer surface containing micro bumps, wherein:

the transparent conductive laminate comprises a cross-linked polymer layer (A) containing fine particles and a cross-linked polymer layer (B) between the transparent polymer substrate and the transparent conductive layer, said cross-linked polymer layer (A) is between the transparent polymer substrate and the cross-linked polymer layer (B); the cross-linked polymer layer (B) contacts the transparent conductive layer; and the outer surface of said transparent conductive layer comprises the bumps having an average height of 0.3 to 1 μm and a density in the range of 350 to 1,800 bumps/mm$^2$.

The transparent conductive laminate wherein the cross-linked polymer layer (A) has a surface facing the cross-linked polymer layer (B), said surface comprises micro bumps having an average height of 0.3 to 1 μm and a density of 350 to 1,800 bumps/mm$^2$.

The transparent conductive laminate wherein the cross-linked polymer layer (B) is 20 to 110 nm in thickness.

The transparent conductive laminate wherein the cross-linked polymer layer (A) comprises a radiation-cured acrylic resin.

The transparent conductive laminate wherein the fine particles have an average diameter of 2 to 4 μm.

The transparent conductive laminate wherein the cross-linked polymer layer (B) does not contain fine particles substantially.

The transparent conductive laminate wherein the cross-linked polymer layer (B) is obtained by hydrolyzation and condensation polymerization of a metal alkoxide.

The transparent conductive laminate wherein the transparent polymer substrate is a film or sheet of a thermoplastic polymer.

The transparent conductive laminate wherein the transparent conductive layer comprises mainly a metal oxide.

A transparent conductive laminate comprises a transparent polymer substrate and a transparent conductive layer, said transparent polymer substrate is a thermoplastic polymer film or sheet, said transparent conductive layer comprising mainly a metal oxide, wherein the transparent conductive layer is disposed on one of sides, and the transparent conductive layer has a surface containing micro bumps, further wherein: (1) the transparent conductive laminate comprises, between the transparent polymer substrate and the transparent conductive layer, a radiation-cured resin layer (A1) which comprises an acrylic resin containing fine particles having an average diameter of 2 to 4 μm, and a cross-linked polymer layer (B1) which does not containing fine particles substantially and obtained by hydrolyzation and condensation polymerization of a metal alkoxide, said radiation-cured resin layer (A1) is disposed between said transparent polymer substrate and the cross-linked polymer layer (B1); (2) the cross-linked polymer layer (B1) has 20 to 110 nm in thickness and contacts with the transparent conductive layer; and (3) the transparent conductive layer has a surface containing micro bumps having an average height of 0.3 to 1 μm and a density of 350 to 1,800 bumps/mm$^2$.

The transparent conductive laminate further comprises a cross-linked polymer layer (C) disposed between the cross-linked polymer layer (A) containing fine particles and the cross-linked polymer layer (B), said cross-linked polymer layer (C) has a higher refractive index than that of the cross-linked polymer layer (B).

The transparent conductive laminate wherein the transparent conductive layer has a surface having an average reflectance of not more than 5.5% in wavelength of 450 to 650 nm and a b* value of transmitted light being −2 to +3, wherein the b* value is obtained based on psychometric chroma coordinates in the CIE 1976 (L*a*b*) Space according to Japan Industrial Standard No. Z8729.

The transparent conductive laminate wherein the cross-linked polymer layer (C) has a refractive index at least 1.7 and not more than that of +0.3 higher than the refractive index of said transparent conductive layer, and has 20 to 90 nm in thickness; the cross-linked polymer layer (B) has 1.35 to 1.5 in refractive index and 30 to 110 nm in thickness; the transparent conductive layer has 12 to 30 nm in thickness; and the cross-linked polymer layer (C), the cross-linked polymer layer (B) and the transparent conductive layer have 180 to 230 nm in total of optical path length of each layer (wherein the optical path length is a value obtained by multiplying a refractive index of a layer with a thickness of the layer).

The transparent conductive laminate wherein the cross-linked polymer layer (C) and the cross-linked polymer layer (B) are cross-linked polymer layers obtained by mainly hydrolyzation and condensation polymerization of metal alkoxides, respectively.

The transparent conductive laminate wherein the cross-linked polymer layer (C) has a refractive index in a range of 1.7 and +0.3 higher than the refractive index of the transparent conductive layer; the cross-linked polymer layer (B) has 1.35 to 1.5 in refractive index; the transparent conductive layer has 12 to 30 nm in thickness; and the polymer layer (B) has a minimum point of surface reflectance within a wavelength range between 260 and 390 nm.

The transparent conductive laminate wherein the cross-linked polymer layer (C) and the cross-linked polymer layer (B) are cross-linked polymer layers obtained by mainly hydrolyzation and condensation polymerization of metal alkoxides, respectively.

A touch panel comprising two transparent electrode substrates, each of which has a conductive layer at least one side of the substrate and the transparent conductive layers of the two substrates face each other, characterized in that at least one of the transparent conductive substrates is the transparent conductive laminate according to claim 1.

The touch panel further comprises a transparent polymer film or sheet being laminated to a side opposite to the side where the transparent conductive layer of the transparent conductive laminate is formed.

Figure 1:
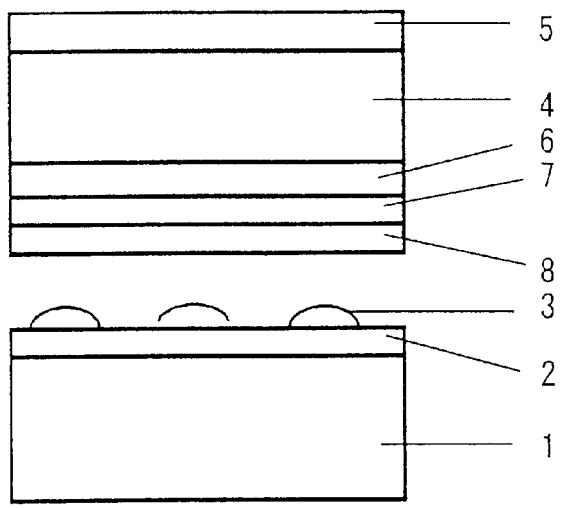
FIG. 1 is a schema showing the concrete touch panels of Examples 1 to 8 and Comparative Examples 1 to 6.

| | Explanation of the marks. |
|---|---|
| 1 | glass substrate |
| 2 | transparent conductive layer |
| 3 | dot spacer |
| 4 | polyethylene terephthalate film or polycarbonate film |
| 5 | cross-linked polymer layer |
| 6 | cross-linked polymer layer containing fine particles |
| 7 | cross-linked polymer layer |
| 8 | transparent conductive layer |
| 9 | cross-linked polymer layer |
| 10 | polarizer |
| 11 | polycarbonate sheet |

The transparent conductive laminate of the present invention is characterized that it has on at least one of sides of a transparent polymer substrate a transparent conductive layer whose outer surface is finely rough, and said surface comprises micro bumps having an average height in the range of 0.3 to 1 μm and a density in the range of 350 to 1,800 bumps/mm².

The average height of the bumps was calculated by randomly selecting 10 to 20 bumps from the bumps in a 250 μm square, individually measuring the heights of the selected bumps and then determining the average value of the measured heights of the bumps.

When said average height of the bumps exceeds 1 μm, the transparent conductive layer is peeled on the peripheries of the bumps without relating to the density of the fine particles, thereby deteriorating the inputting performance of the touch panel (for example, the generation of inputting errors, the insufficient accuracy of position detection). When the average height of the bumps in the transparent conductive layer surface is controlled within the range of 0.3 to 1 μm, the peeling of the transparent conductive layer on the peripheries of the bumps is eliminated to improve the writing durability remarkably. When the average height of the bumps is below 0.3 μm, a problem of adhesion, between the electrode surface of the movable electrode substrate and the electrode surface of the fixed electrode substrate, is caused to interfere with the normal operation of the touch panel, and also a problem of interference fringes generating between the movable electrode substrate and the fixed electrode substrate is caused to give an indistinct screen. The average height of the bumps is preferably in the range of 0.35 to 1.00 μm, more preferably in the range of 0.40 to 1.00 μm.

Of course, it is not necessary that all of the heights of the bumps are controlled within the range of 0.3 to 1 μm. Even if the bumps having heights of 0.1 to 0.3 μm or of 1.0 to 1.5 μm are somewhat contained, the effects of the present invention are substantially not affected, when the average height of the bumps is controlled within the range of 0.3 to 1 μm. However, the maximum height of the bumps is preferably not more than 1.5 μm, more preferably not more than 1.2 μm, because the excessive existence of the bumps having high bump heights is not desirable from the viewpoint of the writing durability.

In addition, in order to prevent the generation of interference fringes between the movable electrode substrate and the fixed electrode substrate, it is important to control the density of the bumps in the surface of the transparent conductive layer within the range of 350 to 1,800 bumps/mm². When the density of bumps is below 350 bumps/mm², effects of preventing the generation of the interference fringes are small. On the other hand, the density exceeding 1,800 bumps/mm² are not preferable, because a problem that the haze of the transparent conductive laminate is increased to give dim display letters difficult to read. The density of bumps is controlled preferably within the range of 400 to 1,600 bumps/mm², more preferably within the range of 450 to 1,550 bumps/mm².

When the average height and the density of bumps in the surface of the transparent conductive layer are 0.3 to 1 μm and 350 to 1,800 bumps/ mm², respectively, preferably 0.35 to 1 μm and 400 to 1,600 bumps/mm², respectively, the touch panel has excellent writing durability, does not cause the generation of interference fringes between the movable electrode substrate and the fixed electrode substrate, and gives non-dim display letters extremely easy to read.

The transparent polymer substrate composing the transparent conductive laminate of the present invention will be explained.

The transparent polymer substrate suitably used in the present invention is especially not limited, but it is preferable that the substrate has high transparency, concretely that the average value of the light transmittance of the substrate in the wavelength region of 400 to 700 nm is not less than 80%, especially not less than 85%.

When the transparent conductive laminate of the present invention is used as a movable electrode substrate, it is preferable that the transparent conductive laminate is flexible. A film or sheet comprising a thermoplastic polymer having good transparency is suitably used as the transparent polymer substrate. Concretely, the film or sheet includes the films or sheets of polyethylene terephthalate, polyethylene naphthalate, a polycarbonate, a polyarylate, a polyethersulfone, a polysulfone, triacetylcellulose, diacetylcellulose, and a polyolefin. The film or sheet-like polymer substrate is suitably formed by a general melt-extruding method, a general solution casting method, or the like. If necessary, the substrate may uniaxially or biaxially be stretched to enhance the mechanical strengths and optical functions of the substrates. The substrate may, if necessary, be laminated to the same or different kind of substrates through adhesives or glues.

The thickness of the transparent polymer substrate is in the range of preferably about 10 to 400 μm, more preferably 20 to 200 μm, from the view points of the operation characteristics, thinness and lightness of the touch panel, and so on. The surface opposite to the transparent conductive layer-disposed surface of the transparent conductive laminate of the present invention may be laminated to a plurality of transparent polymer films or sheets through adhesives or glues to obtain an anti-scratching function, an anti-glare function, an anti-reflection function, and so on, and the laminated transparent conductive laminate may then be used as the movable electrode substrate of the touch panel. The transparent polymer films or sheets laminated to the surface opposite to the transparent conductive layer-disposed surface of the transparent conductive laminate have thickness of preferably 20 to 400 μm, more preferably 50 to 200 μm, the most preferably 70 to 200 μm, respectively.

When the transparent conductive laminate of the present invention is used as a movable electrode substrate, a fixed electrode substrate may be a glass electrode substrate.

When the transparent conductive laminate of the present invention is also used as a fixed electrode substrate, the flexibility is not essential, but a characteristic scarcely deformed by outer forces (rigidity) is rather sometimes needed in a certain use mode of the touch panel. Thereby, the sheet of a thermosetting resin such as an epoxy resin or the sheet of an ultraviolet light-curable resin such as an acrylic resin in addition to the film or sheet of the above-mentioned thermoplastic resin may be used as the transparent polymer substrate of the transparent conductive laminate. A method for forming the transparent polymer substrate includes an injection molding method and a casting polymerization molding method in addition to the above-mentioned methods. If necessary, the transparent polymer substrate may be laminated to the same or different kind of transparent polymer film or sheet through adhesives or glues and then used. The thickness of the substrate obtained thus is preferably about 10 to 2,000 μm, more preferably about 50 to 1,100 μm, the most preferably about 70 to 1,100 μm.

In order to manufacture a touch panel suitable for portable information-processing equipment, the surface opposite to the transparent conductive layer-disposed surface of the transparent conductive laminate of the present invention is rather preferably be laminated to a plurality of transparent polymer films or sheets through adhesive or glues to give rigidity to the laminate, and the laminated transparent conductive laminate is then preferably be used as the fixed electrode substrate of the touch panel. Thereby, the lightweight and infrangible touch panel suitable for portable information-processing equipment is obtained. The thickness of the transparent polymer films or sheets laminated to the surface opposite to the transparent conductive layer-disposed surface of the transparent conductive laminate is preferably 50 to 2,000 μm, more preferably 70 to 2,000 μm and the most preferably 70 to 1,100 μm.

And, a new type touch panel having a structure in which a polarizer (or a polarizer and a retardation film) was laminated to the inputting side (user side) surface of the touch panel was recently developed. The advantage of the structure is to reduce the reflectance of extraneous light in the touch panel to not more than a half and to improve the contrast of the display in a state set to the touch panel.

Here, when the type of the touch panel is attached to a liquid crystal display (LCD), a transparent polymer substrate characterized by excellent optical isotropy is preferably used as the transparent polymer substrate of the transparent conductive laminate, because polarized light passes through the electrode substrate. Concretely, an inplane retardation value Re expressed by the equation: Re=(nx−ny)×d (nm) is preferably at least 30 nm or less, more preferably 20 nm or less, wherein nx, ny and d (nm) are the refractive index of the transparent polymer substrate in the slow axis direction, the refractive index in the fast axis direction, and the thickness of the transparent polymer substrate, respectively. Therein, the inplane retardation value of the transparent polymer substrate is represented by a value measured using a multi-wavelength birefringence measurer (manufactured by Nihon Bunko Co., M-150) at a wavelength of 590 nm.

The film or sheet of a polycarbonate, an amorphous polyarylate, a polyethersulfone, a polysulfone, triacetylcellulose, diacetylcellulose or an amorphous polyolefin or the sheet of a thermosetting resin such as an epoxy resin or the sheet of an ultraviolet light-curable resin such as an acrylic resin among the lo above-mentioned films and sheets is preferable as the transparent polymer substrate characterized by excellent optical isotropy. The film or sheet of the polycarbonate, the amorphous polyarylate, the polyethersulfone, the polysulfone, or the amorphous polyolefin is most preferable from the viewpoint of moldability, production cost, thermal stability, and so on.

The polycarbonate includes polymers each containing at least one bisphenol compound selected from the group consisting of, for example, bisphenol A, 1,1-di(4-phenol) cyclohexylidene, 3,3,5-trimethyl-1,1-di(4-phenyl) cyclohexylidene, fluorene-9,9-di(4-phenol) and fluorene-9, 9-di(3-methyl-4-phenol) and the like as a repeating unit monomer, their copolymers, and their mixtures, preferably a polycarbonate having an average molecular weight in the range of about 15,000 to 100,000 (for example, "Panlite" (produced by Teijin Kasei Co.), "Apec HT" (produced by Bayer AG.)).

And, the amorphous polyarylate includes "Elmec" (produced by Kanegafuchi Kagaku Kogyo K.K.), "U-polymer" (produced by Unitika Ltd.), and "Isaryl" (produced by Isonova Corp.).

Further, the amorphous polyolefin includes "Zeonor" (produced by Nippon Zeon Ltd.) and "Arton" (produced by JSR Corp.).

The method for producing the transparent polymer substrate includes a melt extrusion method, a solution casting method and an injection molding method. The transparent polymer substrate is especially preferably produced by the solution casting method from a viewpoint for obtaining excellent optical isotropy.

In the uses of the touch panel of the type that the polarized light passes through the exemplified electrode substrate, the value of the in-plane retardation values of the electrode substrate and the transparent polymer substrate are very important, and the three-dimensional refractive index characteristics of the electrode substrate and the transparent polymer substrate are additionally important. Namely, when nz is the refractive index of the electrode substrate and the transparent polymer substrate in the film thickness lo direction, K value expressed by the equation: K={(nx+ny)/2−nz}×d is preferably −250 to +150 nm, more preferably −200 to +100 nm, for obtaining the excellent viewing angle characteristic of the touch panel.

The transparent conductive laminate of the present invention has the fine particle-containing cross-linked polymer layer (A) on the transparent conductive layer-disposed side of the above-mentioned transparent polymer substrate.

Here, the fine particles include silica particles, cross-linked acrylic resin particles, and cross-linked polystyrene particles. The average diameter of said fine particles is preferably 2 to 4 μm. When the average diameter of the fine particles exceeds 4 μm, the thickness of the cross-linked polymer layer needs to be enlarged and then dispersion of the thickness is increased. Due to large dispersion of the diameter of the fine particles and due to large dispersion of the thickness of the cross-linked polymer layer, it is consequently difficult to control coating conditions so that an average height of the bumps is included in the range of 0.3 to 1 μm. The preferable average diameter of the fine particles is 2.0 to 3.8 μm.

The fine particle-containing cross-linked polymer layer (A) of the present invention is usually the layer of a cross-linked polymer obtained by curing the particle-added layer of a monomer raw material and/or an oligomer raw material by a polymerization reaction using heat or radiation such as ultraviolet light or electron beams. The cross-linked polymer includes organosilane polymers using silicon alkoxides such as methyltriethoxysilane and phenyltriethoxysilane as monomer raw materials and/or oligomer raw materials, melamine thermosetting resins using etherified methylol melamines or the like as monomer raw materials and/or oligomer raw materials, thermosetting resins such as phenoxy resins and epoxy resins, and radiation-curable resins using multi-functional acrylates such as polyolacrylates, polyesteracrylates, urethane acrylates and epoxy acrylates as monomer raw materials and/or oligomer raw materials. Among the cross-linked polymers, the radiation-curable polymers using the multi-functional acrylate resins and so on are most preferably used, because the cross-linked polymer layer having high cross-link degrees is obtained in relatively short times by the irradiation of radiation and because the cross-linked polymer layer is characterized by low loads on production processes and by having a strong film strength. The diameters of said fine particles, the mixing ratio of said particles with said cross-linked polymer, the film thickness of said cross-linked polymer layer and so on, are adjusted to control the average height of the bumps within the range of 0.3 to 1 μm.

The radiation-curable resin indicates a resin which is polymerized by the irradiation of radiation such as ultraviolet light or electron beams, and includes acrylic resins in whose each composition a multi-functional acrylate component having two or more acryloyl groups in the unit structure is contained. For example, various acrylate monomers such as trimethylolpropane triacrylate, trimethylolpropane ethylene oxide-modified triacrylate, trimethylolpropane propylene oxide-modified triacrylate, isocyanuric acid ethylene oxide-modified triacrylate, pentaerythritol tetraacrylate, dipentaerythritol pentaacrylate, dipentaerythritol hexaacrylate, and dimethyloltricyclodecane diacrylate, multi-functional acrylate oligomers such as polyester-modified acrylates, urethane-modified acrylates, and epoxy-modified acrylates, and so on, are preferable for the touch panel uses. The monomer raw materials and/or the oligomer raw materials may be used singly or after mixed with each other, and, if necessary, the hydrolytic condensation product of a silicon alkoxide is preferably added to the composition of the monomer raw materials and/or the oligomer raw materials in a proper amount.

Therein, when the resin layer is polymerized by the irradiation of ultraviolet light, a proper amount of a known photopolymerization initiator is added. The photopolymerization initiator includes acetophenone compounds such as diethoxyacetophenone, 2-methyl-1-{4-(methylthio) phenyl}-2-morpholinopropane, 2-hydroxy-2-methyl-1-phenylpropan-1-one, and 1-hydroxycyclohexylphenylketone; benzoin compounds such as benzoin and benyldimethylketal; benzophenone compounds such as benzophenone and benzoylbenzoate; and thioxanthone compounds such as thioxanthone and 2,4-dichlorothioxanthone.

The phenoxy thermosetting resin includes the thermally cross-linked product of a phenoxy resin, phenoxy ether resin or phenoxy ester resin of the below-mentioned formula (1) with a multi-functional isocyanate compound,

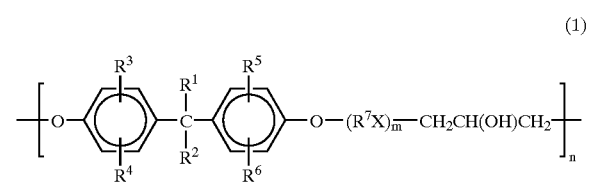

(1)

wherein, $R^1$ to $R^6$ each means the same or different hydrogen or a $C_1$ to $C_3$ alkyl group; $R^7$ means a $C_2$ to $C_5$ alkylene group; X means an ether group or an ester group; m means an integer of 0 to 3; n means an integer of 20 to 300. Among the resins, a resin of the formula (1), wherein $R^1$, $R^2$ each is a methyl group; $R^3$ to $R^6$ each is a hydrogen; and $R^7$ is a pentylene group, is preferable from the aspects of synthesis easiness and productivity.

And, the multi-functional isocyanate is a compound having two or more isocyanate groups in the molecule, including the following compounds. Polyisocyanates such as 2,6-tolylenediisocyanate,. 2,4-tolylenediisocyaante, tolylenediisocyanate-trimethylolpropane adduct, t-cyclohexane-1,4-diisocyanate, m-phenylenediisocyanate, p-phenylenediisocyanate, hexamethylenediisocyanate, 1,3, 6-hexamethylenetriisocyanate, isophoronediisocyanate, 1,5-naphthalenediisocyanate, tolidinediisocyanate, xylylenediisocyanate, hydrogenated xylylenediisocyanate, diphenylmethane-4,4'-diisocyanate, hydrogenated diphenylmethane-4,4'-diisocyanate, lysinediisocyanate, lysine ester triisocyanate, triphenylmethanetriisocyanate, tris(isocyanatophenyl)thiophosphate, m-tetramethylxylylenediisocyanate, p-tetramethylxylylenediisocyanate, 1,6,11-undecanetriisocyanate, 1,8-diisocyanato-4-isocyanatomethyloctane, bicycloheptanetriisocyanate, 2,2, 4-trimethylhexamethylenediisocyanate and 2,4,4-trimethylhexamethylenediisocyanate, and their mixtures or polyhydric alcohol adducts. Among the compounds, 2,6-tolylenediisocyanate, 2,4-tolylenediisocyanate, tolylenediisocyanate-trimethylolpropane adduct and hexamethylenediisocyanate are especially preferable from the viewpoints of generality and reactivity.

Further, a tertiary amine such as known triethylenediamine or an organic tin compound such as di-n-butyltindilaurate can be added in a proper amount as a reaction accelerator to improve the rate of the cross-linking reaction.

And, for example, the thermally cross-linked product of a novolak type epoxy resin expressed by the below-mentioned formula (2) is preferable as the epoxy thermosetting resin.

(2)

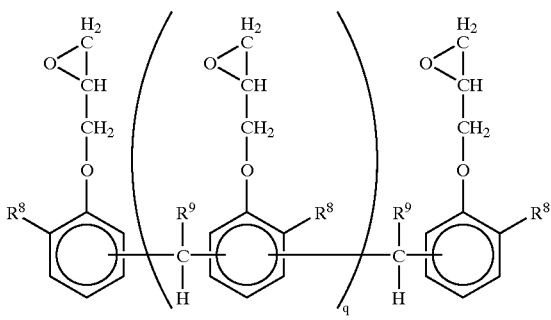

wherein, $R^8$ indicates a hydrogen or a methyl group; $R^9$ indicates a hydrogen or a glycidylphenyl ether group; and q indicates an integer of 1 to 50, but since the value of q generally has a distribution and is difficult to specify, q is preferably a large value as an average number, more preferably not less than 3 or more, furthermore preferably 5 or more.

A known curing agent is applied as a curing agent for cross-linking the epoxy resin. For example, a curing agent such as an amine-based curing agent, a polyaminoamide-based curing agent, an acid and an acid anhydride, imidazole, a mercaptan, or a phenolic resin is used. Among the curing agents, preferably an acid anhydride or an alicyclic amine compound, more preferably an acid anhydride, is used. The acid anhydride includes alicyclic acid anhydrides such as methylhexahydrophthalic acid anhydride and methyltetrahydrophthalic anhydride, aromatic acid anhydrides such as phthalic acid anhydride, and aliphatic acid anhydrides such as dodecylphthalic acid anhydride, especially preferably methylhexahydrophthalic acid anhydride. Further, the alicyclic amine includes bis(4-amino-3-methyldicyclohexyl)methane, diaminocyclohexylmethane and isophoronediamine, especially preferably bis(4-amino-3-methyldicyclohexyl)methane.

Here, when an acid anhydride is used as a curing agent, a reaction accelerator for accelerating the curing reaction of an epoxy resin with the acid anhydride may be added. The reaction accelerator includes known secondary and tertiary amines such as benzylmethyamine, 2,4,6-tris(dimethylaminomethyl)phenol, pyridine, and 1,8-diazabicyclo(5,4,0)undecene-1, and imidazole compounds.

And, the polymer of the silicon alkoxide is preferably obtained from a mixture of two or more di- to tetra-functional, more preferably tri- to tetra-functional, silicon alkoxides or from an oligomer obtained by preliminarily suitably hydrolyzing and dehydrating-condensing the mixture in a solution.

The silicon alkoxide includes tetramethoxysilane, tetraethoxysilane, methyltrimethoxysilane, methyltriethoxysilane, dimethyldimethoxysilane, γ-glycidoxypropyltrimethoxysilane, β(3,4-epoxycyclohexyl)ethyltrimethoxysilane, vinyltrimethoxysilane, N-β-(aminoethyl)-γ-aminopropyltrimethoxysilane, N-β-(aminoethyl)-γ-aminopropylmethyldimethoxysilane, and γ-aminopropyltriethoxysilane.

The silicon alkoxides are thermally polymerized, and, if necessary, the cross-linkage degree of the obtained polymer can be enhanced by irradiating the coating film of the polymer with active light such as ultraviolet light.

A proper anchor layer is disposed on or above the transparent polymer substrate and is between the particle-containing cross-linked polymer layer (A) and the transparent polymer substrate. The anchor layer preferably includes the following layers. (1) A layer having a function for improving the adhesivity of said polymer layer to the substrate, (2) various phase difference compensation layers such as a layer whose three-dimensional refractive index characteristic gives negative K value, (3) a layer having a viscoelastic characteristic for relaxing stresses (vertical stress, horizontal stress) added to a substrate, such as the layer that the storage elastic modulus is about 1 kg/mm$^2$ or less at a temperature near to room temperature, (4) a layer having a function for preventing the permeation of moisture and air or a function for absorbing moisture and air, (5) a layer having a function for absorbing ultraviolet light and infrared light, and (6) a layer having a function for lowering the electrification property of the substrate.

The method for forming the fine particle-containing cross-linked polymer layer (A) of the present invention comprises adding the fine particles to the above-mentioned monomer raw material and/or the above-described oligomer raw material, if necessary, further adding a photopolymerization initiator, a curing agent, a catalyst, and so on, dissolving the mixture in one of a proper organic solvent or more, adjusting the concentration and viscosity of the solution to prepare a coating liquid, coating the coating liquid on the transparent polymer substrate, and then curing the coating layer by the irradiation of radiation, a thermal treatment or the like. The coating method includes various coating methods such as a microgravure coating method, a Mayer bar coating method, a direct gravure coating method, a reverse roll coating method, a curtain coating method, a die coating method, a knife coating method and a spin coating method.

When the cross-linked polymer layer (B) is disposed on or above the particle-containing cross-linked polymer layer (A) and is between the particle-containing cross-linked polymer layer (A) and the transparent conductive layer according to the present invention, the optical characteristics and mechanical characteristics of the transparent conductive laminate are improved. Therein, the cross-linked polymer layer (B) is preferably prepared by hydrolyzing and condensation polymerizing a metal alkoxide. Titanium alkoxides, zirconium alkoxides and silicon alkoxides are preferable among the metal alkoxides from viewpoints such as excellent mechanical strengths, excellent stability, excellent adhesivity to the transparent conductive layer, the substrate, and so on. The embodiments of the metal alkoxides and the method for forming the cross-linked polymer layer (B) will be mentioned later. And two or more kinds of the monomer raw materials and/or the oligomer raw materials may be mixed with each other and then used.

The cross-linked polymer layer (B) may contain an additive such as fine particles, but it is preferable that the cross-linked polymer layer (B) does substantially not contain the additive, because it is difficult to control the heights of the bumps and the density of the bumps in the surface of the transparent conductive layer and because the strength of the cross-linked polymer layer (B) is weakened, when the cross-linked polymer layer (B) contains the additive.

When only the cross-linked polymer layer (B) is disposed between the particle-containing cross-linked polymer layer (A) and the transparent conductive layer, the thickness of the cross-linked polymer layer (B) is preferably not less than 20 nm, more preferably not less than 25 nm, furthermore preferably not less than 30 nm. When the thickness of the layer (B) is less than 20 nm, the effect for improving the optical characteristics and mechanical characteristics of the transparent conductive laminate is small. The upper limit of the thickness of the layer (B) is preferably not more than 110 nm, more preferably not more than 100 nm. When the thickness of the layer (B) exceeds 110 nm, the optical characteristics and mechanical characteristics of the transparent conductive laminate are sometimes contrarily deteriorated.

A cross-linked polymer layer (C) having a larger refractive index than that of the cross-linked polymer layer (B) can be disposed between the particle-containing cross-linked polymer layer (A) and the cross-linked polymer layer (B) to lower the reflectance of the transparent conductive laminate in the visible light region to improve the transmittance. In the case, the total of optical path length of the three layers of the cross-linked polymer layer (C), the cross-linked polymer layer (B), and the transparent conductive layer is preferably adjusted to give an average reflectance of not more than 5.5% in wavelengths of 450 to 650 nm on the surface of the transparent conductive layer and give the b* value of transmitted light in the range of −2 to +3 as the b* value based on psychometric chroma coordinates in the CIE 1976 (L*a*b*) Space according to Japan Industrial Standard No. Z8729. When the average reflectance and the b* value are adjusted to 5.5% or less and the range of −2 to +3, respectively, the visibility of a display is substantially not deteriorated, even when the touch panel is attached to the display.

Conditions for realizing the above-mentioned average reflectance and the above-mentioned b* value are as follows.

Namely, (1) the cross-linked polymer layer (C) has a refractive index in a range of from 1.7 to +0.3 higher than the refractive index of the transparent conductive layer, and is in a range of from 20 to 90 nm in thickness; the cross-linked polymer layer (B) has a refractive index in a range of from 1.35 to 1.5 and is in a range of from 30 to 110 nm in thickness; the transparent conductive layer has a thickness of 12 to 30 nm; and the cross-linked polymer layer (C), the cross-linked polymer layer (B) and the transparent conductive layer have a value of 180 to 230 nm in total of optical path length of the above three layers (wherein the optical path length is a value obtained by multiplying a refractive index of a layer with a thickness of the layer).

Or, (2) the cross-linked polymer layer (C) has a refractive index in a range of from 1.7 to +0.3 higher than the refractive index of the transparent conductive layer; the cross-linked polymer layer (B) has a refractive index in a range of from 1.35 to 1.5; the transparent conductive layer has 12 to 30 nm in thickness; and the polymer layer (B) has a minimum point of surface reflectance within a wavelength range between 260 and 390 nm.

The cross-linked polymer layer (C) and the cross-linked polymer layer (B) preferably comprise cross-linked polymer layers obtained by mainly hydrolyzing and condensation polymerizing metal oxides, respectively. Among the cross-linked polymer layers obtained by hydrolyzation and condensation polymerization of the metal oxides, polymer layers obtained by hydrolyzing and condensation polymerizing titanium alkoxides, zirconium alkoxides and silicon alkoxides are preferable from viewpoints that the mechanical strengths, stability, and so on, of the polymer layers and the adhesivity of the polymer layers to the transparent conductive layers, the cross-linked polymer layers, and the like, are excellent.

The titanium alkoxides includes titanium tetraisoproxide, tetra-n-propyl ortho titanate, titanium tetra-n-butoxide, and tetrakis(2-ethylhexyloxy) titanate. The zirconium alkoxide includes zirconium tetraisopropoxide, and zirconium tetra-n-butoxide.

The silicon alkoxide includes tetramethoxysilane, tetraethoxysilane, methyltrimethoxysilane, methyltriethoxysilane, dimethyldimethoxysilane, γ-glycidoxypropyltrimethoxysilane, β-(3,4-epoxycyclohexyl)ethyltrimethoxysilane, vinyltrimethoxysilane, N-β-(aminoethyl)-γ-aminopropyltrimethoxysilane, N-β-(aminoethyl)-γ-aminopropylmethyldimethoxysilane, and γ-aminopropyltriethoxysilane. If necessary, two or more kinds of the silicon alkoxides are preferably mixed and used in many cases from the viewpoints of the mechanical strengths, adhesivity, solvent resistance, and so on, of the layers, and it is especially preferable that the silicon alkoxides having amino groups in the molecules are contained in an amount of 0.5 to 60 percent by weight in the whole composition of the silicon alkoxides.

The metal alkoxides may be used as the monomers as such or as oligomers after preliminarily suitably subjected to hydrolysis reactions and dehydrating condensation polymerization reactions. Usually, the metal alkoxides are dissolved and diluted with one or more proper organic solvents, and the obtained coating liquid is then coated on a substrate. The coating film formed on the substrate is hydrolyzed with moisture in air or the like and then dehydrated and condensation polymerized. A proper heating treatment is generally necessary for the acceleration of the condensation polymerization reaction, and in the process of a coating method, it is preferable that a heating treatment at a temperature of not less than 100° C. for several minutes or more is applied. And, if necessary, the above-mentioned thermal treatment and the irradiation of active light such as ultraviolet light on the coating film may simultaneously be carried out to enhance the cross-linking degree of the coating film.

As the diluting solvent, an alcoholic solvent or a hydrocarbon-based solvent, such as ethanol, 2-propanol, butanol, 2-methyl-1-propanol, 1-methoxy-2-propanol, hexane, cyclohexane, or ligroin is suitable, and a polar solvent such as xylene, toluene, cyclohexanone, methylisobutylketone or isobutyl acetate may also be used. The solvents may be used singly or as a mixed solvent comprising two or more kinds of the solvents.

The transparent conductive layer of the present invention is disposed on the above-mentioned cross-linked polymer layer (B). The transparent conductive layer comprises mainly a metal oxide. From needs for the reduction in the electric power consumption of the touch panel and on the processing of circuits, and so on, it is preferable to use a transparent conductive layer exhibiting a surface resistance value in the range of preferably 100 to 2,000 Ω/■, more preferably 150 to 2,000Ω/■, at a film thickness of 12 to 30 nm. When the thickness of the transparent conductive layer is below 12 nm, the thickness is not preferable, because the stability of the resistance value with the passage of time tends to be inferior, while the thickness exceeding 30 nm is also not preferable, because the transmittance of the transparent conductive laminate is lowered.

Said metal oxide includes tin oxide containing antimony or the like, indium tin oxide (ITO), and indium zinc oxide. And, the transparent conductive layer may further contain one or more kinds of metal oxides such as silicon dioxide, titanium dioxide, aluminum trioxide, zirconium dioxide and zinc oxide.

The transparent conductive layer can be formed by a known physical vapor deposition (PVD) such as a sputtering method, an ion plating method, or a vacuum evaporation method, or a CVD method. In particular, the sputtering method is preferable from the aspects of the uniformity of the thickness and composition of the transparent conductive layer in the transverse direction (TD) and the machine direction (MD).

In order to prevent the scratching or solvent damage of a transparent polymer substrate in a process for manufacturing a touch panel or in a using mode of the touch panel attached to a display, it is preferable to dispose a cross-linked polymer layer having a hard coat property and/or a solvent-resistant property on the opposite side of the transparent polymer substrate to the transparent conductive layer-disposed side. Fine particles may be added to the cross-linked polymer layer to impart a slipping property, an interference fringe-preventing property and an anti-glare property. The cross-linked polymer includes the radiation-curable resins such as the acrylic resins, the thermosetting resins such as the phenoxy resins and the epoxy resins, and the silicon alkoxide polymers, as mentioned above. Among the cross-linked polymers, the radiation-curable resins such as the acrylic resins are most preferably used, because the cross-linked polymer layer having high cross-link degrees is obtained in relatively short times by the irradiation of radiation and because the cross-linked polymer layer is characterized by low loads on production processes and by having a strong film strength.

A proper anchor layer is disposed on the transparent polymer substrate, and is between the cross-linked polymer layer and the transparent polymer substrate. The anchor layer includes the same anchor layers as those used for the above-mentioned particles-containing cross-linked polymer layer (A).

A method for forming the cross-linked polymer layer also includes the same methods as those for forming the above-mentioned particles-containing cross-linked polymer layer (A).

EXAMPLES

The present invention will be explained hereafter in more detail with examples, but methods for evaluating average height of bumps, density of bumps, ten point height (Rz), and writing durability of the outer surface of the transparent conductive layer are as follows.

Average bump height, bump density

The average height of bumps was obtained by randomly selecting ten to twenty bumps in a 250 $\mu$m square by the use of a real time scanning type laser microscope (manufactured by Laser Tech Corp., 1LDM21D), individually measuring the heights of the bumps and then calculating the average height of the bumps. The density of the bumps (the number of bumps per unit area) was also calculated.

Ten Point Height

Ten point height (Rz) was measured using a stylus type difference thickness meter (manufactured by Sloan Corp, Dektak 3).

The measurement was carried under measuring conditions comprising a measuring length of 2 mm, a measuring speed of 4.8 mm/minute, 1,000 data, and a 20 $\mu$m high pass filter.

Writing Durability

The transparent conductive laminate of the present invention and a glass electrode substrate were used as a movable electrode substrate and a fixed electrode substrate, respectively, to manufacture a touch panel. But, the transparent conductive laminate of the present invention was used as a fixed electrode substrate in Example 10. Then, katakana (square Japanese characters) were written in the order of the katakana syllabary in a 20 mm square area on the outer central surface of the movable electrode substrate of the touch panel by the use of a polyacetal resin pen having a 0.8R tip. The writing pressure load of the pen was 250 g. linearity was measured for each 50,000 letter-written time. The number of the written letters until the linearity exceeds 1.5% was defined to be writing durability.

A method for measuring the linearity was as follows.

A direct current voltage of 5V was applied between parallel electrodes on the movable electrode substrate or on the fixed electrode substrate. Electric voltages were measured at a distance of 5 mm in the direction vertical to the parallel electrodes.

$$ET=(EB-EA)\cdot X/(B-A)+EA$$

$$L(\%)=(|ET-EX|)/(EB-EA)\cdot 100$$

Wherein EA is the voltage at a measurement-started position A; EB is the voltage of a measurement-finished position; EX is an observed voltage value at a distance of X from the position A; ET is a theoretical value; L is linearity.

Examples 1 Through 3, Comparative Examples 1 Through 3

FIG. 1 is a touch panel showing an example of the present invention. In FIG. 1, 1 is a glass substrate; 2 and 8 are transparent conductive layers; 3 is a dot spacer; 4 is a polyethylene terephthalate (PET) film; 5 is a cross-linked polymer layer; 6 is a particle-containing cross-linked polymer layer; and 7 is a cross-linked polymer layer. A fixed electrode substrate A comprises the glass substrate 1, the transparent conductive layer 2, and the dot spacer 3. A movable electrode substrate comprises the PET film 4, the cross-linked polymer layer 5, the particle-containing cross-linked polymer layer 6, the cross-linked polymer layer 7 and the transparent conductive layer 8.

The touch panel was manufactured as follows. $SiO_2$ layers were disposed on both the surfaces of the 1.1 mm-thick glass substrate 1 by a dip coating method, and a 18 nm-thick ITO layer was then disposed as the transparent conductive layer 2 by a sputtering method. The dot spacer 3 having a height of 7 $\mu$m, a diameter of 70 $\mu$m and a pitch of 1.5 mm was disposed on the ITO layer to manufacture the fixed electrode substrate.

On the other hand, a 188 $\mu$m-thick PET film (produced by Teijin Ltd., OFW) was prepared as a transparent polymer substrate.

Then, for the formation of the cross-linked polymer layer 5, a coating liquid L comprising 50 parts by weight of a polyester acrylate (produced by Toa Kagaku Kabushiki Kaisha, Alonix M8060), 50 parts by weight of dipentaerythritol hexaacrylate (produced by Nippon Kayaku Kabushiki Kaisha, DPHA), 7 parts by weight of a photocuring initiator (produced by Ciba-Geigy, Irgacure 184), and 200 parts by weight of 1-methoxy-2-propanol as a diluent. The coating liquid L was coated on one surface of the PET film, and then dried for 1 minute at 60° C. The produced coating film was irradiated and cured with light by the use of a high pressure mercury lamp having a strength of 160 w/cm in a condition comprising an integrated light quantity of 450 mJ/cm² to dispose the cross-linked polymer layer 5 (thickness: about 3 $\mu$m).

Subsequently, the above-mentioned coating liquid L for the cross-linked polymer layer 5 was mixed with a prescribed amount of either of silicon cross-linked particles (produced by GE Toshiba Silicone Co., Tospearl 130) having an average diameter of about 3 $\mu$m, acryl cross-linked particles (Negami Kogyo Kabushiki Kaisha, Artpearl F5P)

having an average diameter of about 3.4 μm, and silicone cross-linked particles (GE Toshiba Silicone Co., Tospearl 145) having an average diameter of about 4.5 μm to obtain various coating liquids L' for the cross-linked polymer layers 6. Either of the coating liquids L' was coated on the non-coated surface (the surface on which the above-mentioned cross-linked polymer layer 5 was not disposed) of the PET film so as to give a thickness of about 2 to 3 μm after cured. The coated coating liquid L' was dried at 60° C. for 1 minute and then irradiated with light by the use of a high pressure mercury lamp lo having a strength of 160 w/cm in a condition comprising an integrated light quantity of 450 mJ/cm² to form the particle-containing cross-linked polymer layer 6.

Thus, in Examples, various particle-containing cross-linked polymer layers having different average heights of the bumps and different densities of the bumps were formed by changing the particle diameters of the fine particles added thereto, the amounts of the fine particles and the thicknesses of the particle-containing cross-linked polymer layers.

Subsequently, a coating liquid M for the cross-linked polymer layer 7 was prepared by the following procedure. Namely, 720 parts by weight of water, 1,080 parts by weight of 2-propanol and 46 parts by weight of acetic acid were mixed with each other, further successively mixed with 480 parts by weight of γ-glycidoxypropyltrimethoxysilane (produced by Shinetsu Chem. Ind. Co., KBM 403), 240 parts by weight of methyltrimethoxysilane (produced by Shinetsu Chem. Ind. Co., KBM 13) and 120 parts by weight of N-β(aminoethyl)-γ-aminopropyltrimethoxysilane (produced by Shinetsu Chem. Ind. Co., KBM 603), and then stirred for three hours to hydrolyze and partially condense the alkoxysilane mixture liquid. The product was diluted with the 1:1 weight ratio mixture of 2-propanol with 1-methoxy-2-propanol to prepare the coating liquid M for the cross-linked polymer layer 7. The coating liquid M was coated on the above-mentioned particle-containing cross-linked polymer layer 6 and then thermally treated at 130° C. for five minutes to form the cross-linked polymer layer 7 having a thickness of about 35 nm.

Subsequently, the transparent conductive layer 8 was disposed to the above-mentioned polymer layer 7. As the transparent conductive layer 8, an indium tin oxide (ITO) layer was formed in a thickness of about 20 nm by a DC magnetron sputtering method. An ITO target comprising indium oxide and tin oxide in a 95:5 weight ratio and having a packing density of 98% was used as the target. The above-mentioned film was set to the inside of a sputtering machine, and the sputtering machine was evacuated to a pressure of 1.3 mPa and then charged with a 98.5:1.5 volume ratio mixture gas of Ar with $O_2$ to give an inner atmospheric pressure of 0.27 Pa. The set film was subjected to a sputtering treatment under conditions comprising a substrate temperature of 50° C. and a making power density of 1 W/m² to deposit the ITO layer as the transparent conductive layer 8 on the above-mentioned cross-linked polymer layer 7. The surface resistance of the transparent conductive layer was about 300 Ω/■.

The transparent conductive laminate obtained thus was used as a movable electrode substrate.

And, as Comparative Example 3, a movable electrode substrate was manufactured by directly depositing the ITO layer on the particle-containing cross-linked polymer layer 6 without disposing the cross-linked polymer layer 7.

The movable electrode substrate and the fixed electrode substrate were used to manufacture the touch panel showed in FIG. 1. Therein, FIG. 1 is a conception diagram showing a part of the structure, and a peripheral insulating layer, an adhesive layer and a leading circuit to outsides were omitted.

The average heights of bumps, the densities of bumps, ten point height (Rz) and writing durability test results of the transparent conductive layer (ITO layer) surfaces of the movable electrode substrates are shown in Table 1.

TABLE 1

| | Fine particles | | States of ITO layer surface | | | | | Evaluation |
|---|---|---|---|---|---|---|---|---|
| | *1 | *2 | *3 | *4 | *5 | *6 | *7 | *8 |
| Example 1 | 3.0 | 0.7 | 0.49 | 0.65 | 0.34 | 820 | 0.22 | >15 |
| Example 2 | 3.0 | 1.4 | 0.60 | 0.82 | 0.47 | 1170 | 0.19 | >15 |
| Example 3 | 3.4 | 1.4 | 1.00 | 1.11 | 0.90 | 900 | 0.24 | 15 |
| Comparative Example 1 | 3.4 | 1.0 | 1.06 | 1.33 | 0.78 | 700 | 0.33 | 5 |
| Comparative Example 2 | 4.5 | 0.4 | 1.15 | 1.59 | 0.90 | 300 | 0.28 | <5 |
| Comparative Example 3 | 3.4 | 1.4 | 1.00 | 1.11 | 0.90 | 900 | 0.24 | <5 |

*1 average diameter (μm).
*2 addition amount (parts by weight in solid content).
*3 average height of bumps (μm).
*4 maximum height of bumps (μm).
*5 minimum height of bumps (μm).
*6 density of bumps (bumps/mm²).
*7 Rz (μm).
*8 writing durability (10,000 times)

Examples 4 Through 8, Comparative Examples 4 Through 6

Various transparent conductive laminates were manufactured similarly as in Examples 1 through 3. The transparent conductive laminates were used as movable electrode substrates to manufacture the touch panels of FIG. 1. The outer surfaces of the movable electrode substrates were pushed with a finger to bring the movable electrode substrates into contact with the fixed electrode substrates, and the states of interference fringes generated with a three band phosphor type fluorescent lamp were observed from the sides of the fixed electrode substrates. The evaluation results are shown in Table 2. And, the touch panels were attached to LCDs, and easiness degrees in seeing letters were observed. The evaluation results are shown in Table 3.

TABLE 2

| | Fine particles | | States of ITO layer surface | | | | | Evaluation |
|---|---|---|---|---|---|---|---|---|
| | *1 | *2 | *3 | *4 | *5 | *6 | *7 | *9 |
| Example 4 | 3.0 | 1.7 | 0.73 | 0.84 | 0.60 | 1550 | 0.23 | nothing |
| Example 5 | 3.0 | 1.4 | 0.60 | 0.82 | 0.47 | 1170 | 0.19 | nothing |
| Example 6 | 3.0 | 1.0 | 0.64 | 0.72 | 0.52 | 1080 | 0.27 | nothing |
| Example 7 | 3.0 | 0.7 | 0.55 | 0.82 | 0.39 | 850 | 0.22 | nothing |
| Comparative Example 4 | 3.0 | 0.15 | 0.66 | 1.06 | 0.36 | 210 | 0.11 | slightly existent |
| Comparative Example 5 | 3.0 | 1.4 | 0.28 | 0.36 | 0.19 | 1340 | 0.09 | existent |

*1 average diameter (μm).
*2 addition amount (parts by weight in solid content).
*3 average height of bumps (μm).
*4 maximum height of bumps (μm).
*5 minimum height of bumps (μm).
*6 density of bumps (bumps/mm²).
*7 Rz (μm).
*9 influence fringe

TABLE 3

| | Fine particles | | States of ITO layer surface | | | | | Evaluation |
|---|---|---|---|---|---|---|---|---|
| | *1 | *2 | *3 | *4 | *5 | *6 | *7 | *10 |
| Example 8 | 3.0 | 1.4 | 0.60 | 0.82 | 0.47 | 117 | 0.19 | good |
| Comparative Example 6 | 3.0 | 2.3 | 0.77 | 0.88 | 0.67 | 2070 | 0.24 | dim |

*1 average particle diameter ($\mu$m).
*2 addition amount (parts by weight in solid content).
*3 average height of bumps ($\mu$m).
*4 maximum height of bumps ($\mu$m).
*5 minimum height of bumps ($\mu$m).
*6 density of bumps (bumps/mm$^2$).
*7 Rz ($\mu$m).
*10 easiness degree in seeing letters Example 9, Comparative Example 7

Figure 2:
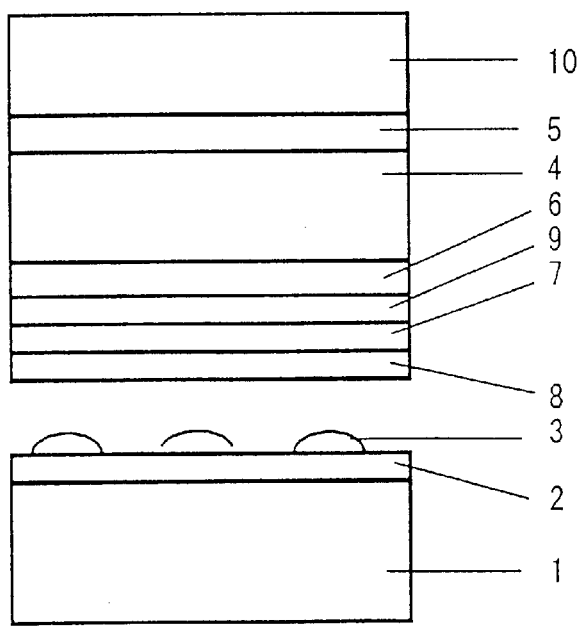
FIG. 2 is a schema showing the concrete touch panels of Example 9 and Comparative Example 7.

FIG. 2 is a touch panel showing an example of the present invention. In FIG. 2, 1 is a glass substrate; 2 and 8 are transparent conductive layers; 3 is a dot spacer; 4 is a polycarbonate (PC) film; 5 is a cross-linked polymer layer; 6 is a particle-containing cross-linked lo polymer layer; 7, 9 are cross-linked polymer layers; and 10 is a polarizer. A fixed electrode substrate comprises the glass substrate 1, the transparent conductive layer 2, and the dot spacer 3. A movable electrode substrate comprises the polarizer 10, the PC film 4, the cross-linked polymer layer 5, the particle-containing cross-linked polymer layer 6, the cross-linked polymer layers 7, 9 and the transparent conductive layer 8. In order to manufacture the touch panel, the fixed electrode substrate was manufactured by the same method as in Examples 1 through 3.

In Example 9, a 100 $\mu$m-thick PC film (produced by Teijin Ltd., Pureace) was used instead of the PET film as the transparent polymer substrate. The others were carried out similarly as in Example 2, and fine particles having an average diameter of 3 $\mu$m were used. Thus, the cross-linked polymer layer 5 (thickness: about 3 $\mu$m) and the particle-containing cross-linked polymer layer 6 (thickness: about 2.6 $\mu$m) were disposed on one surface and the other surface of the PC film, respectively.

Subsequently, a coating liquid N for the cross-linked polymer layer 9 was prepared by the following procedure. Namely, the coating liquid N for the cross-linked polymer layer 9 was prepared by diluting tetrabutoxytitanate (produced by Nihon Soda Co., B-4) with a mixture solvent of ligroin with butanol. The coating liquid N for the cross-linked polymer layer 9 was coated on the particle-containing cross-linked polymer layer 6 and then thermally treated at 130° C. for two minutes to form the cross-linked polymer layer 9 having a thickness of about 41 nm and a refractive index of about 1.82.

Further, the coating liquid M in Example 1 was used as a coating liquid for the cross-linked polymer layer 7. The coating liquid M was coated on the cross-linked polymer layer 9 and then thermally treated at 130° C. for 5 minutes to form the cross-linked polymer layer 7 having a thickness of about 51 nm and a refractive index of about 1.47. The minimum wavelength of the surface reflectance of the cross-linked polymer layer 7 was 300 nm.

Then, the transparent conductive layer 8 was disposed on the cross-linked polymer layer 7 to form the laminate similarly as in Example 1. The surface resistance of the transparent conductive layer of the electrode substrate for Example 9 was about 300 Ω/■, and the average height and density of bumps in the surface of the transparent conductive layer were 0.6 $\mu$m and 1,170 bumps/mm$^2$, respectively. The laminate was used as the movable electrode substrate of Example 9.

And, in Comparative Example 7, a 100 $\mu$m-thick PC film (produced by Teijin Ltd., Pureace) was used instead of the PET film as the transparent polymer substrate. The others were carried out similarly as in Comparative Example 2, and fine particles having an average diameter of 4.5 $\mu$m were used. Thus, the cross-linked polymer layer 5 (thickness: about 3 $\mu$m) and the particle-containing cross-linked polymer layer 6 (thickness: about 3.1 $\mu$m) were disposed on one surface and the other surface of the PC film, respectively. Subsequently, the coating liquid N for the cross-linked polymer layer 9 was coated on the particle-containing cross-linked polymer layer 6 and then thermally treated at 130° C. for two minutes to form the cross-linked polymer layer 9 having a thickness of about 41 nm and a refractive index of about 1.82. Further, the coating liquid M of Example 1 was used as a coating liquid for the cross-linked polymer layer 7. The coating liquid M was coated on the cross-linked polymer layer 9 and then thermally treated at 130° C. for 5 minutes to form the cross-linked polymer layer 7 having a thickness of about 51 nm and a refractive index of about 1.47. The minimum wavelength of the surface reflectance of the cross-linked polymer layer 7 was 300 nm.

Subsequently, the transparent conductive layer 8 was formed on the cross-linked polymer layer 7 to form the laminate similarly as in Example 1. The surface resistance of the transparent conductive layer of the electrode substrate for Comparative Example 7 was about 300 Ω/■, and the average height and density of bumps in the surface of the transparent conductive layer were 1.15 $\mu$m and 300 bumps/mm$^2$, respectively. The laminate was used as the movable electrode substrate of Comparative Example 7.

The electrode substrate, a fixed electrode and a polarizer (produced by Sanrittsu K.K., LLC2-9218AGHSF) were used to manufacture a touch panel shown in FIG. 2. Therein, FIG. 2 is a conception diagram showing a part of the structure, and a peripheral insulating layer, an adhesive layer and a leading circuit to outsides were omitted.

The writing durability of the touch panel of Example 9 was 200,000 times and extremely excellent.

On the other hand, the writing durability of the touch panel of Comparative Example 7 was 50,000 times and inferior.

Example 10

Figure 3:
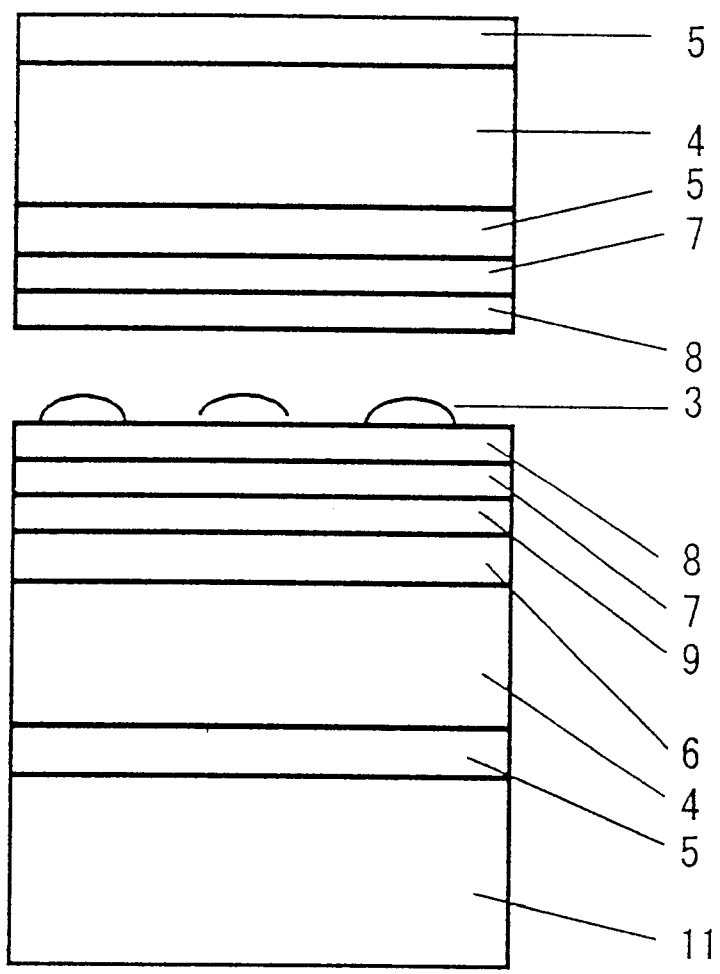
FIG. 3 is a schema showing the concrete touch panel of Example 10.

FIG. 3 is a touch panel showing an example of the present invention. In FIG. 3, 3 is a dot spacer; 4 is a PET film or PC film; 5 is a cross-linked polymer layer; 6 is a particle-containing cross-linked polymer layer; 7, 9 are cross-linked polymer layers; 8 is a transparent conductive layer; and 11 is a PC sheet. A fixed electrode substrate comprises the PC sheet 11, the PC film 4, the cross-linked polymer layer 5, the particle-containing cross-linked polymer layer 6, the cross-linked polymer layers 7, 9, the transparent conductive layer 8 and a dot spacer 3. A movable electrode substrate comprises the PET film 4, the cross-linked polymer layer 5, the cross-linked polymer layer 7 and the transparent conductive layer 8.

The movable electrode substrate of the touch panel was manufactured by the following method. The coating liquid L used in Example 1 was coated on one surface of a 188 $\mu$m-thick PET film (produced by Teijin Ltd., OFW) as a transparent polymer substrate. The coating film was dried at 60° C. for one minute and then cured by the irradiation of light in a condition comprising an integrated light quantity of 450 mJ/cm² by the use of a high pressure mercury lamp having a strength of 160 w/cm to dispose the cross-linked polymer layer 5 (thickness: about 3 μm). Similarly, a cross-linked polymer layer 5 (thickness: about 3 μm) was disposed on the opposite side of the PET film.

Subsequently, the coating liquid M used in Example 1 was coated on one of the cross-linked polymer layers 5 and then thermally treated at 130° C. for five minutes to form the cross-linked polymer layer 7 having a thickness of about 35 nm.

Subsequently, the transparent conductive layer 8 was disposed to the cross-linked polymer layer 7 to form a movable electrode substrate by the same method as in Example 1. The surface resistance of the transparent conductive layer 8 was about 300 Ω/■.

Then, the fixed electrode substrate was manufactured as follows.

Similarly in Example 9, a 100 μm-thick PC film (produced by Teijin Ltd., Pureace) was used as a transparent polymer substrate, and the cross-linked polymer layer 5 (thickness: about 3 μm) and the particle-containing cross-linked polymer layer 6 (thickness: about 2.6 μm) were disposed on one surface and the other surface of the PC film, respectively.

Subsequently, by the same method as in Example 9, the cross-linked polymer layer 9 having a thickness of about 41 nm and a refractive index of about 1.82 was formed on the particle-containing cross-linked polymer layer 6, and the cross-linked polymer layer 7 having a thickness of about 51 nm and a refractive index of about 1.47 was formed on the cross-linked polymer layer 9. The minimum wavelength of the surface reflectance of the cross-linked polymer layer 7 was 300 nm.

Successively, similarly as in Example 1, the transparent conductive layer 8 having a thickness of about 22 nm and a refractive index of about 2.0 was disposed to the cross-linked polymer layer 7 to form the electrode substrate. The surface resistance of the transparent conductive layer of the electrode substrate was about 300 Ω/■, and the average height and the density in the surface of the transparent conductive layer were 0.6 μm and 1,170 bumps/ mm², respectively. The b* value of psychometric chroma coordinates of transmitted light in the CIE 1976 (L*a*b*) Space was +0.6.

Then, a 1 mm-thick PC sheet (produced by Teijin Chem. Ltd., Panlite) 11 was adhered to the surface of the cross-linked polymer layer 5 on the opposite side of the electrode substrate to the side on which the transparent conductive layer 8 was disposed. Further, the dot spacer 3 having a height of 7 μm, a diameter of 70 μm and a pitch of 1.5 mm was disposed on the transparent conductive layer 8 to form the fixed electrode substrate.

The movable electrode substrate and the fixed electrode substrate were used to form the touch panel shown in FIG. 3. Therein, the present Figure is a conception diagram showing a part of the structure, and a peripheral insulating layer, an adhesive layer and a leading circuit to outsides were omitted.

The writing durability of the touch panel was 150,000 times and excellent. Further, the touch panel has characteristics that the touch panel is lightweight and is not broken down, even when dropped.

Utilization in Industry

As mentioned above, since the average height of bumps and the density of bumps in the surface of the transparent conductor layer are 0.3 to 1 μm and 350 to 1,800 bumps/ mm², respectively, the transparent conductive laminate of the present invention can be used as an electrode substrate to provide a touch panel which has excellent writing durability, does not generate an interference fringe in the touch panel, does not make the letters of the display dim, and gives extremely easily readable letters.

What is claimed is:

1. A transparent conductive laminate comprising a transparent polymer substrate and a transparent conductive layer disposed on at least one of sides of the transparent polymer substrate, said transparent conductive layer has a surface containing micro bumps, wherein:
   (1) said transparent conductive laminate comprises a cross-linked polymer layer (A) containing fine particles and a cross-linked polymer layer (B) between the transparent polymer substrate and the transparent conductive layer, said cross-linked polymer layer (A) is disposed between the transparent polymer substrate and said cross-linked polymer layer (B);
   (2) the cross-linked polymer layer (B) contacts the transparent conductive layer; and
   (3) the surface of said transparent conductive layer comprises the bumps having an average height of 0.3 to 1 μm and a density in the range of 350 to 1,800 bumps/ mm².

2. The transparent conductive laminate according to claim 1, wherein the cross-linked polymer layer (A) has a surface facing the cross-linked polymer layer (B), said surface comprises micro bumps having an average height of 0.3 to 1 μm and a density of 350 to 1,800 bumps/mm².

3. The transparent conductive laminate according to claim 1, wherein the cross-linked polymer layer (B) is 20 to 110 nm in thickness.

4. The transparent conductive laminate according to claim 1, wherein the cross-linked polymer layer (A) comprises a radiation-cured acrylic resin.

5. The transparent conductive laminate according to claim 1, wherein the fine particles have an average diameter of 2 to 4 μm.

6. The transparent conductive laminate according to claim 1, wherein the cross-linked polymer layer (B) does not contain fine particles substantially.

7. The transparent conductive laminate according to claim 1, wherein the cross-linked polymer layer (B) is obtained by hydrolyzation and condensation polymerization of a metal alkoxide.

8. The transparent conductive laminate according to claim 1, wherein the transparent polymer substrate is a film or sheet of a thermoplastic polymer.

9. The transparent conductive laminate according to claim 1, wherein the transparent conductive layer comprises mainly a metal oxide.

10. A transparent conductive laminate comprises a transparent polymer substrate and a transparent conductive layer, said transparent polymer substrate is a thermoplastic polymer film or sheet, said transparent conductive layer comprising mainly a metal oxide, wherein the transparent conductive layer is disposed on one of sides, and the transparent conductive layer has a surface containing micro bumps, further wherein:
   (1) said transparent conductive laminate comprises, between the transparent polymer substrate and the transparent conductive layer, a radiation-cured resin layer (A1) which comprises an acrylic resin containing fine particles having an average diameter of 2 to 4 μm, and a cross-linked polymer layer (B1) which does not containing fine particles substantially and obtained by hydrolyzation and condensation polymerization of a metal alkoxide, said radiation-cured resin layer (A1) is disposed between said transparent polymer substrate and the cross-linked polymer layer (B1);

(2) said cross-linked polymer layer (B1) has 20 to 110 nm in thickness and contacts with the transparent conductive layer; and (3) said transparent conductive layer has a surface containing midcro bumps having an average height of 0.3 to 1 μm and a density of 350 to 1,800 bumps/mm$^2$.

11. The transparent conductive laminate according to claim 1, the laminate further comprises a cross-linked polymer layer (C) disposed between the cross-linked polymer layer (A) containing fine particles and the cross-linked polymer layer (B), said cross-linked polymer layer (C) has a higher refractive index than that of the cross-linked polymer layer (B).

12. The transparent conductive laminate according to claim 11, wherein said transparent conductive layer has a surface having an average reflectance of not more than 5.5% in wavelength of 450 to 650 nm and a b* value of transmitted light being −2 to +3, wherein said b* value is obtained based on psychometric chroma coordinates in the CIE 1976 (L*a*b*) Space according to Japan Industrial Standard No. Z8729.

13. The transparent conductive laminate according to claim 12, wherein the cross-linked polymer layer (C) has a refractive index in a range of 1.7 and +0.3 higher than the refractive index of said transparent conductive layer, and has 20 to 90 nm in thickness; said cross-linked polymer layer (B) has 1.35 to 1.5 in refractive index and 30 to 110 nm in thickness; said transparent conductive layer has 12 to 30 nm in thickness; and the cross-linked polymer layer (C), the cross-linked polymer layer (B) and the transparent conductive layer have 180 to 230 nm in total of optical path length of each layer (wherein the optical path length is a value obtained by multiplying a refractive index of a layer with a thickness of the layer).

14. The transparent conductive laminate according to claim 13, wherein the cross-linked polymer layer (C) and the cross-linked polymer layer (B) are cross-linked polymer layers obtained by mainly hydrolyzation and condensation polymerization of metal alkoxides, respectively.

15. The transparent conductive laminate according to claim 12, wherein said cross-linked polymer layer (C) has a refractive index in a range of 1.7 and +0.3 higher than the refractive index of said transparent conductive layer; said cross-linked polymer layer (B) has 1.35 to 1.5 in refractive index; said transparent conductive layer has 12 to 30 nm in thickness; and said polymer layer (B) has a minimum point of surface reflectance within a wavelength range between 260 and 390 nm.

16. The transparent conductive laminate according to claim 15, wherein said cross-linked polymer layer (C) and said cross-linked polymer layer (B) are cross-linked polymer layers obtained by mainly hydrolyzation and condensation polymerization of metal alkoxides, respectively.

17. A touch panel comprising two transparent electrode substrates, each of the substrates has a conductive layer at least one side of the substrate, the transparent conductive layers of the two substrates face each other, characterized in that at least one of the transparent conductive substrates is the transparent conductive laminate according to claim 1.

18. The touch panel according to claim 17, said touch panel further comprises a transparent polymer film or sheet being laminated to a side opposite to the side where the transparent conductive layer of the transparent conductive laminate is formed.

* * * * *